United States Patent [19]

Schmit et al.

[11] Patent Number: 4,551,337

[45] Date of Patent: Nov. 5, 1985

[54] FRIED PIZZA PRODUCT AND PROCESS FOR PREPARING SAME

[75] Inventors: Justin M. Schmit; Eugene H. Luoma, both of Duluth, Minn.

[73] Assignee: Jeno's, Inc., Casselberry, Fla.

[21] Appl. No.: 425,023

[22] Filed: Sep. 30, 1982

[51] Int. Cl.$^4$ .............................................. A21D 13/00
[52] U.S. Cl. ..................................... 426/94; 426/302; 426/439; 426/503
[58] Field of Search ................... 426/94, 95, 138, 289, 426/439, 302, 437, 479, 496, 503

[56] References Cited

U.S. PATENT DOCUMENTS

| | | | |
|---|---|---|---|
| 2,905,559 | 9/1959 | Anderson et al. | 426/439 |
| 3,687,688 | 8/1972 | Stapley et al. | 426/637 |
| 4,170,659 | 10/1979 | Totino et al. | 426/95 |

*Primary Examiner*—Raymond Jones
*Assistant Examiner*—Elizabeth A. King
*Attorney, Agent, or Firm*—Willian Brinks Olds Hofer Gilson & Lione Ltd.

[57] ABSTRACT

A fried pizza crust and a complete pizza product are produced with a method in which perforations are formed in a pizza dough sheet by removing small plugs of dough. Each perforated dough piece is then submerged in a hot oil bath until the crust is fried. The fried crust is removed from the oil and drained, after which it is topped with sauce. The sauce flows into funnel shaped depressions formed over each perforation, some of the sauce flowing through the perforations before congealing. Other topping materials are then applied to the sauce covered crust. The finally topped pizza includes small pools of sauce and flavor enhanced crust areas.

8 Claims, 8 Drawing Figures

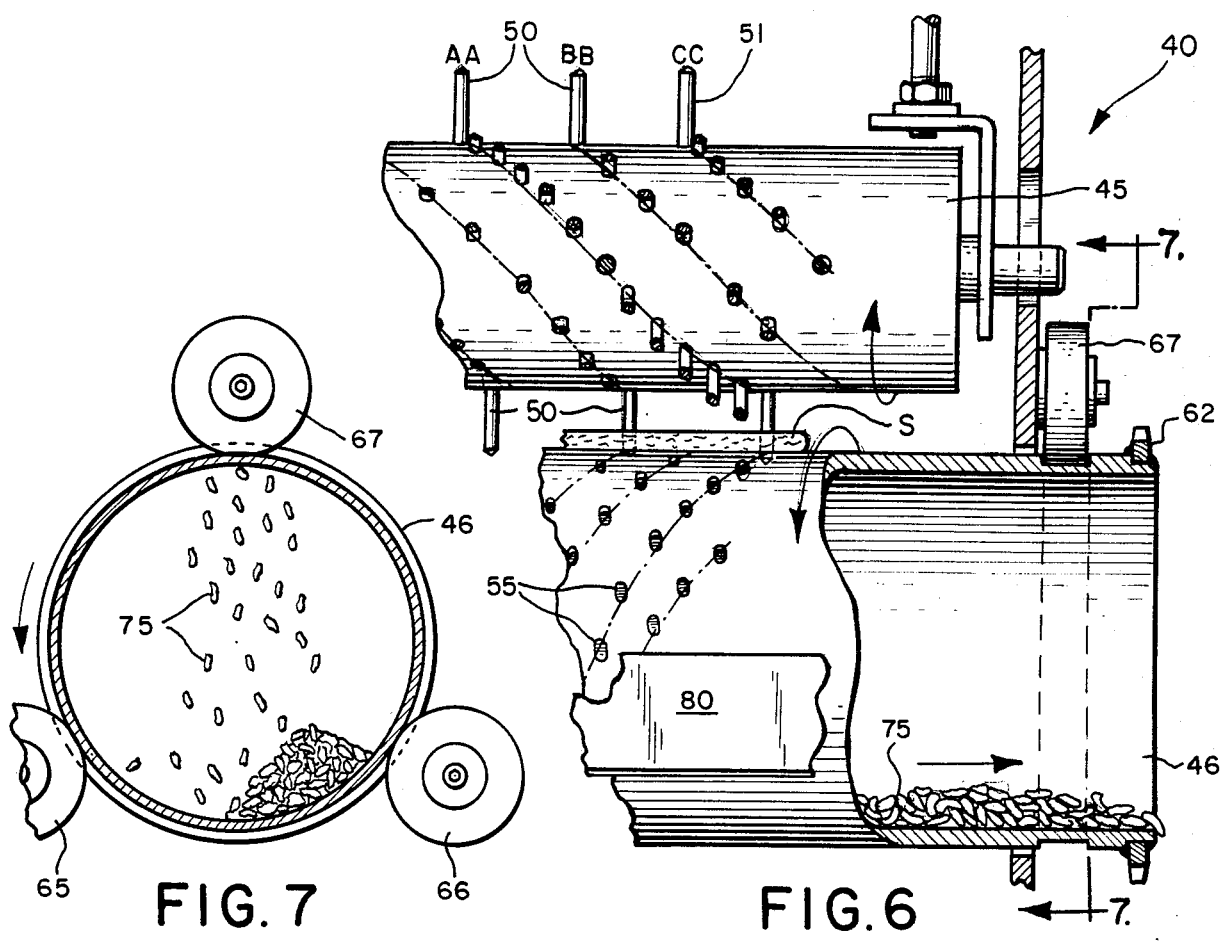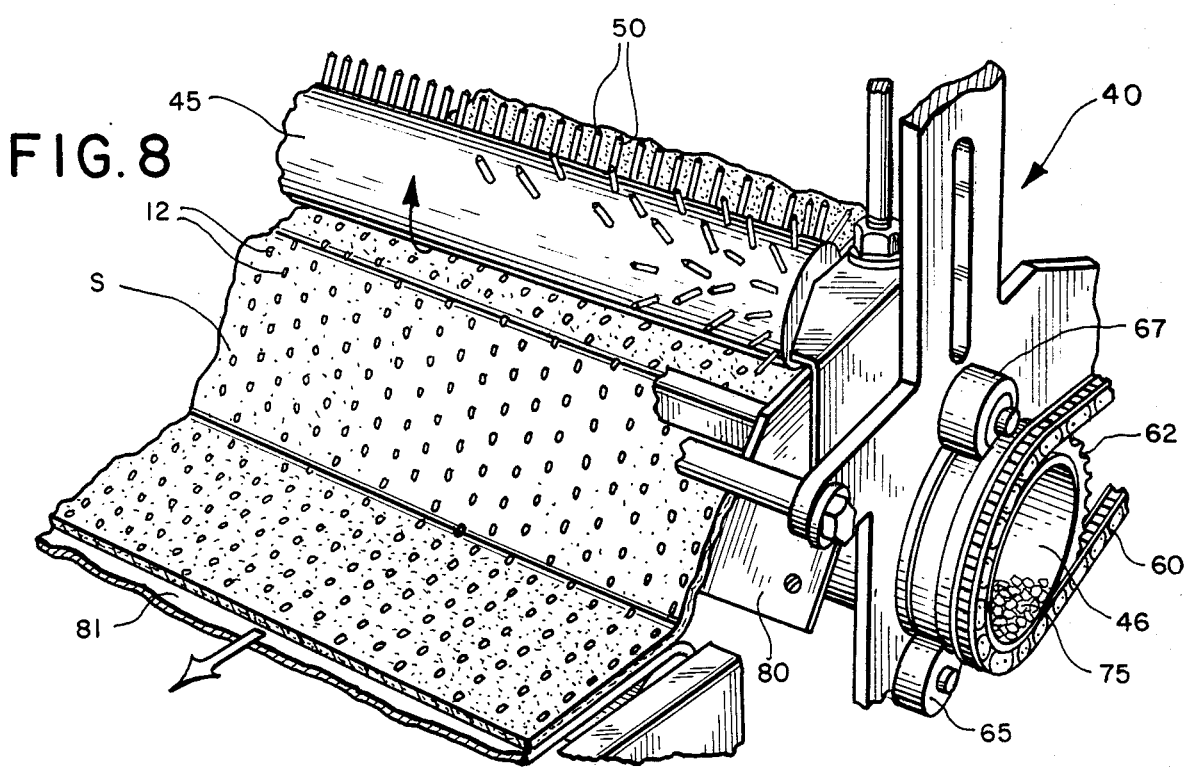

FRIED PIZZA PRODUCT AND PROCESS FOR PREPARING SAME

FIELD OF THE INVENTION

This invention is in the field of food products and processes. It relates particularly to a pizza product and to a process for making a pizza product including a deep fried dough base.

BACKGROUND OF THE INVENTION

Italian housewives have made Neopolitan pizza in their homes for many years. Neopolitan pizza has a deep fried crust. The process of making Neopolitan pizza involves deep frying a hand rolled piece of dough in a pan of hot oil. In order to prevent excessive delamination and "ballooning" of the upper skin of the crust the dough is periodically punctured with a fork during frying. When one side of the pizza dough-piece is fried, the flattened dough piece is flipped over and the process is repeated on the other side.

In recent years the Neopolitan pizza has gone commercial, so to speak. The Neopolitan pizza process was modernized using deep-frying techniques and equipment which the industry had been using for years. U.S. Pat. No. 4,170,659 was issued on a product and process for making fried pizza crusts.

Adapting existing deep frying equipment to the frying of pizza crusts, a sheeted pizza dough was deep fried by submerging it in hot oil. The sheeted dough was docked in a conventional manner to prevent excessive delamination, i.e., in a commerical application of the old Neopolitan pizza process of poking holes in the dough with a fork a mechanized piercing of the dough sheet with a multitude of docking pins was effected. The concept of docking a pizza dough base to prevent delamination was old in the bakery art.

The docked dough sheet was then cut into individual pizza dough bases and fried. The dough bases were confined during deep frying. According to the Totino et al patent, this involved submerging the dough under a grid which permitted only controlled growth of blisters on the crust to a precisely predetermined, maximum height, through the carefully proportioned apertures, or providing vertically-spaced submerging screens which performed the same function. The concept of confining a submerged dough product during deep frying to limit its vertical growth was also old in the art.

The fried crust pizzas which were produced and which are presently on the market have shortcomings, however. Principal among these is the occurrence of "white" spots in the crust. These spots occur where steam has collected under the crust during frying and prevented the oil from frying the crust uniformly.

SUMMARY OF THE INVENTION

An object of the present invention is to provide a new and improved process for preparing frozen pizza. Another object is to provide an improved process for preparing a fried crust. Still another object is to provide a crust preparation process wherein small dough plugs are removed from the sheeted dough in a prescribed pattern to produce perforations which cannot close up during frying. Yet another object is to provide a pizza preparation process wherein topping sauce is applied to the fried crust and permitted to flow through the perforations and congeal therein to form pools of sauce and enhanced flavor in the product. A further object is to provide an improved pizza product. Another object is to provide an improved fried pizza crust.

The foregoing and other objects are realized in accord with the present invention by:

(A) providing a wheat flour dough sheeted out to a predetermined thickness;

(B) perforating the dough sheet in a prescribed pattern of perforations, each perforation being characterized by the removal of a small plug of dough;

(C) cutting the perforated dough sheet into individual pizza dough bases of selected size;

(D) floating the dough bases onto the surface of a hot oil bath in a deep fryer and submerging the dough bases in the oil by means of a fine mesh upper conveyor screen which moves the frying bases through the oil with the limited amount of friction developed between the dough base seeking to float and the fine mesh screen holding it down;

(E) removing the fried crust from the oil bath, draining the oil from its surface and cooling the crust; and (F) topping the crust with sauce which flows through the perforations and congeals in and around them, both above and below the fried crust, forming small pools of sauce and flavor enhanced areas in the finally topped pizza.

BRIEF DESCRIPTION OF THE DRAWINGS

The invention, including the steps of the process and the pizza product, is illustrated more or less diagrammatically in the drawings, in which:

FIG. 6 is a front elevational view of a portion of the unit in operation as illustrated in FIG. 5;

FIG. 7 is a sectional view taken along line 7—7 of FIG. 6; and

FIG. 8 is a perspective view of a perforated dough sheet leaving the unit.

DESCRIPTION OF THE PREFERRED EMBODIMENTS

Figure 1:
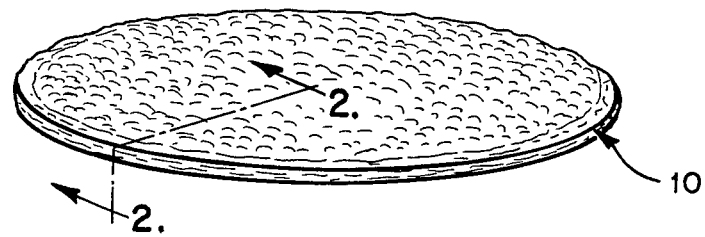
FIG. 1 is a perspective view of a frozen pizza prepared according to the present invention.
Figure 2:
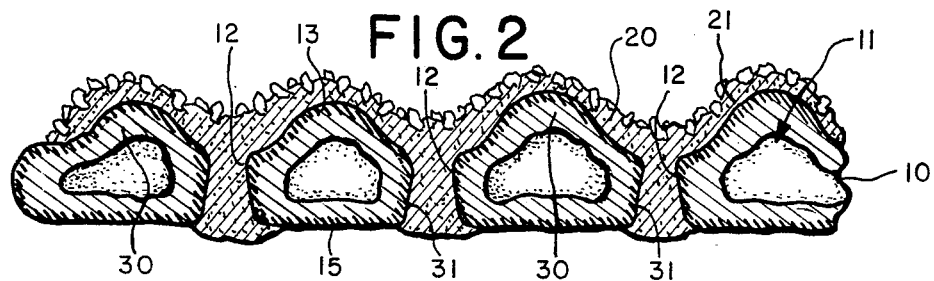
FIG. 2 is a sectional view taken along line 2—2 of FIG. 1.

Referring now to the drawings, and particularly to FIGS. 1 and 2, a pizza product embodying features of the present invention is illustrated generally at 10. The pizza product 10 is depicted prior to a freezing and packaging operation. It should be understood, however, that the product 10 is produced for marketing as a frozen and packaged product.

The pizza product 10 includes a deep fried crust 11 having a plurality of perforations 12 extending through it from its top surface or skin 13 to and through its bottom surface or skin 15. The top surface or skin 13 of the crust 11 is covered with conventional pizza topping materials 20. These topping materials 20 include a coating 21 of tomato sauce immediately on the crust surface or skin 13. The toppings 20 also include a layer of cheese particles. In addition, depending upon the type of pizza desired, the toppings 20 might include pieces of ground meat, pepperoni, peppers, mushrooms and/or other food topping materials.

Figure 3:
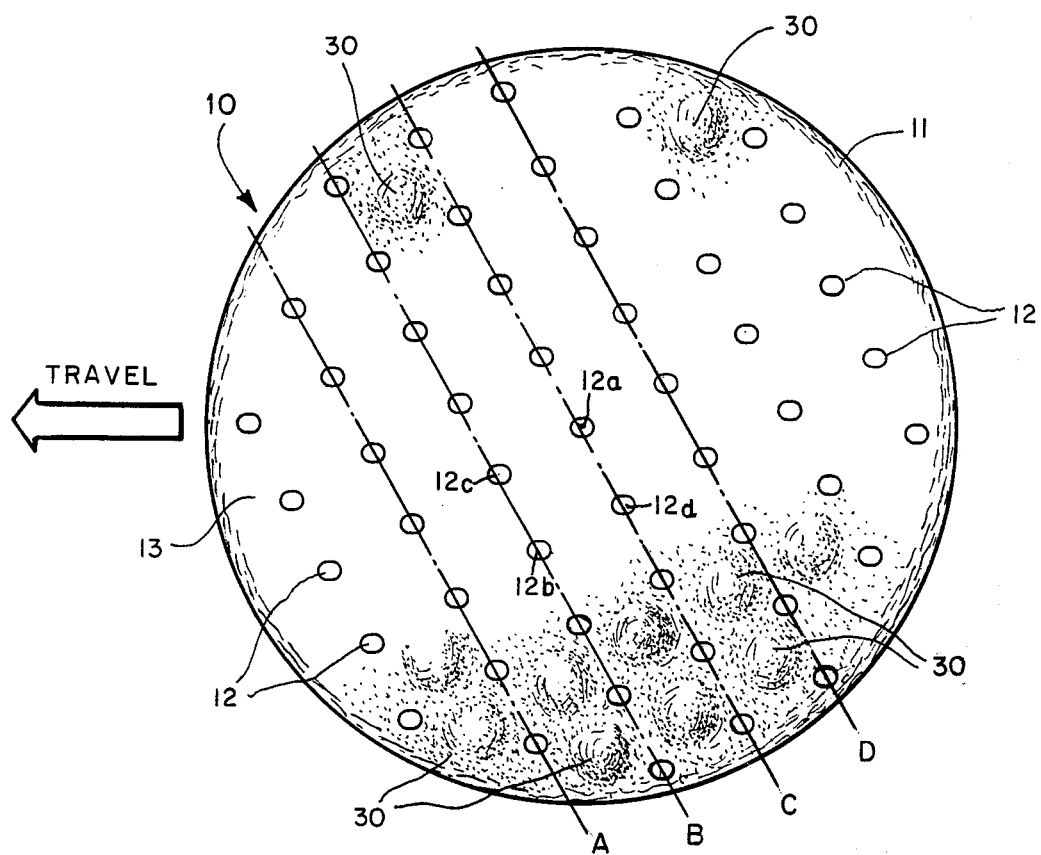
FIG. 3 is a top plan view of a fried crust prior to topping.

As seen in FIG. 3, which illustrates an untopped crust 11, and in FIG. 2, which illustrates a topped crust, the perforations 12 are all disposed in areas of the crust 11 where the top skin 13 and the bottom skin 15 have not separated, i.e., they have not delaminated. At the same time, between perforations 12 the skins 13 and 15 have delaminated to form what amount to blisters 30.

The blisters 30 encircling each perforation form what are, in effect, funnels 31 extending downwardly to and through the perforation. The tomato sauce is applied so that it fills up these funnels 31 and tends to run through the perforations 12 before it congeals and closes the perforations. A pool of tomato sauce is thus effectively formed in each funnel 31, extending downwardly through the corresponding perforation 12 and slightly onto the bottom skin 15 of the crust 11. The effect, as will hereinafter be discussed in greater detail, is to provide regularly spaced areas of enhanced tomato sauce taste across the pizza when the consumer eats it after heating it in an oven on a rack or cookie tray, for example.

According to the invention, the perforations 12 are disposed in rows A, B, C, et seq., extending parallel to each other and diagonally across the face of the crust 11. In this regard "diagonally" means relative to the direction of travel of the crust 11 as it is processed (see arrow in FIG. 3). The rows A, B, C, et seq., are disposed at an angle of 30° to the direction of travel.

In the illustrated embodiment of the pizza product 10, after the crust 11 is fried the perforations 12 in any one row A, B, C, et seq., are spaced five-eighths of an inch ($\frac{5}{8}''$) apart. As shall subsequently be discussed, when the perforations are formed in the dough sheet prior to cutting and frying they are spaced three-quarters of an inch ($\frac{3}{4}''$) apart, but the frying process is effective to shrink the individual dough bases slightly as the crust is formed and thus slightly diminish the spacing between the perforations 12.

The diagonal rows A, B, C, et seq., of perforations 12 are also spaced five-eighths of an inch ($\frac{5}{8}''$) apart. Like the spacing between perforations 12 in any one row, these rows are originally formed in the dough sheet, prior to frying, three-quarters of an inch ($\frac{3}{4}''$) apart. The aforementioned shrinkage which takes place is also effective to shorten the spacing between the rows A, B, C, et seq., to approximately five-eighths of an inch ($\frac{5}{8}''$).

As seen in FIG. 3, the diagonal relationship of the rows A, B, C, et seq., creates diamond shaped patterns of perforations 12 when viewed in the direction of travel. The perforations 12 in alternating rows A, C, et seq., are staggered relative to perforations 12 in row B. As a result, the distance between perforations 12a and 12b in any one diamond pattern is not five-eighths of an inch ($\frac{5}{8}''$) but more approximates one-and-one-eighth inches ($1\frac{1}{8}''$). Similarly, the distance between perforations 12c and 12d is approximately one-and-one-eighth inches ($1\frac{1}{8}''$).

Figure 4:
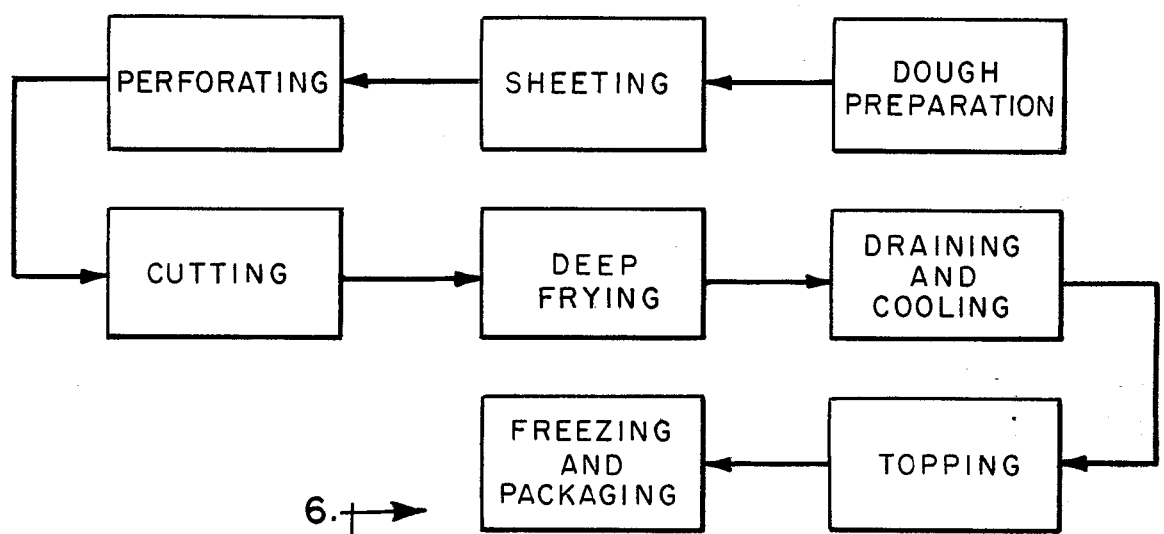
FIG. 4 is a block diagram, flow sheet of a process including the process steps of the invention.

Referring now to FIG. 4, steps in a pizza making process are illustrated in block diagram. The process of the present invention relates to portions of the overall process inclusive of perforating and topping.

FIGS. 5–8 illustrate the perforating unit 40 and process. A dough sheet S, which is final sheeted down to 0.3 inches in thickness and thirty-six inches (36") in width, is shown entering the perforating unit 40 in FIG. 5.

The perforating machine 40 includes cooperating upper and lower drums 45 and 46, between which the sheet S passes. The upper drum 45 has a multitude of perforating pins 50 extending radially from its outer surface. The perforating pins 50 are, in the present illustration, stainless steel pins one-eighths inch ($\frac{1}{8}''$) in diameter and one-and-one-quarter inches ($1\frac{1}{4}''$) long. Each pin 50 has a conical shaped tip 51 on it, forming what approximates a point.

The pins 50 are aligned in rows AA, BB, CC, et seq., on the outer surface of the drum 45, as best seen in FIG. 6, the rows extending parallel to each other in spiral relationship around the drum. The tips 51 of the pins 50 in each row AA, BB, CC, et seq., are spaced three-quartes of an inch ($\frac{3}{4}''$) from each other. In addition, the rows AA, BB, CC, et seq., are positioned on the drum 45 so that the spiral paths of their pin tips 51 are three-quarters of an inch ($\frac{3}{4}''$) apart.

The three-quarters of an inch ($\frac{3}{4}''$) spacing of pins 50 and rows AA, BB, CC, et seq., may be varied to achieve corresponding variations in perforation 12 spacing. In practice one inch (1") and one and one-quarter inch ($1\frac{1}{4}''$) pin and row spacing have been utilized.

The drum 46 is hollow, as best seen in FIG. 7. It is fabricated of one quarter inch ($\frac{1}{4}''$) thick stainless steel plate which forms a cylindrical wall 52. The cylindrical wall 52 is perforated radially by circumferentially elongated apertures 55 arranged in a pattern corresponding to the tips 51 of the pins 50 on the drum 45.

Each aperture 55 is slightly wider than one-eighth of an inch ($\frac{1}{8}''$), longitudinally of the drum 46, and three eighths of an inch ($\frac{3}{8}''$) long, circumferentially of the drum 46. The drum 46 is spaced one inch (1") from the drum 45 so that the pins 50 mesh with the apertures 55 in gear-like relationship, the tips 51 extending to the interior of the drum 46 when corresponding pins 50 are in mesh.

Figure 5:
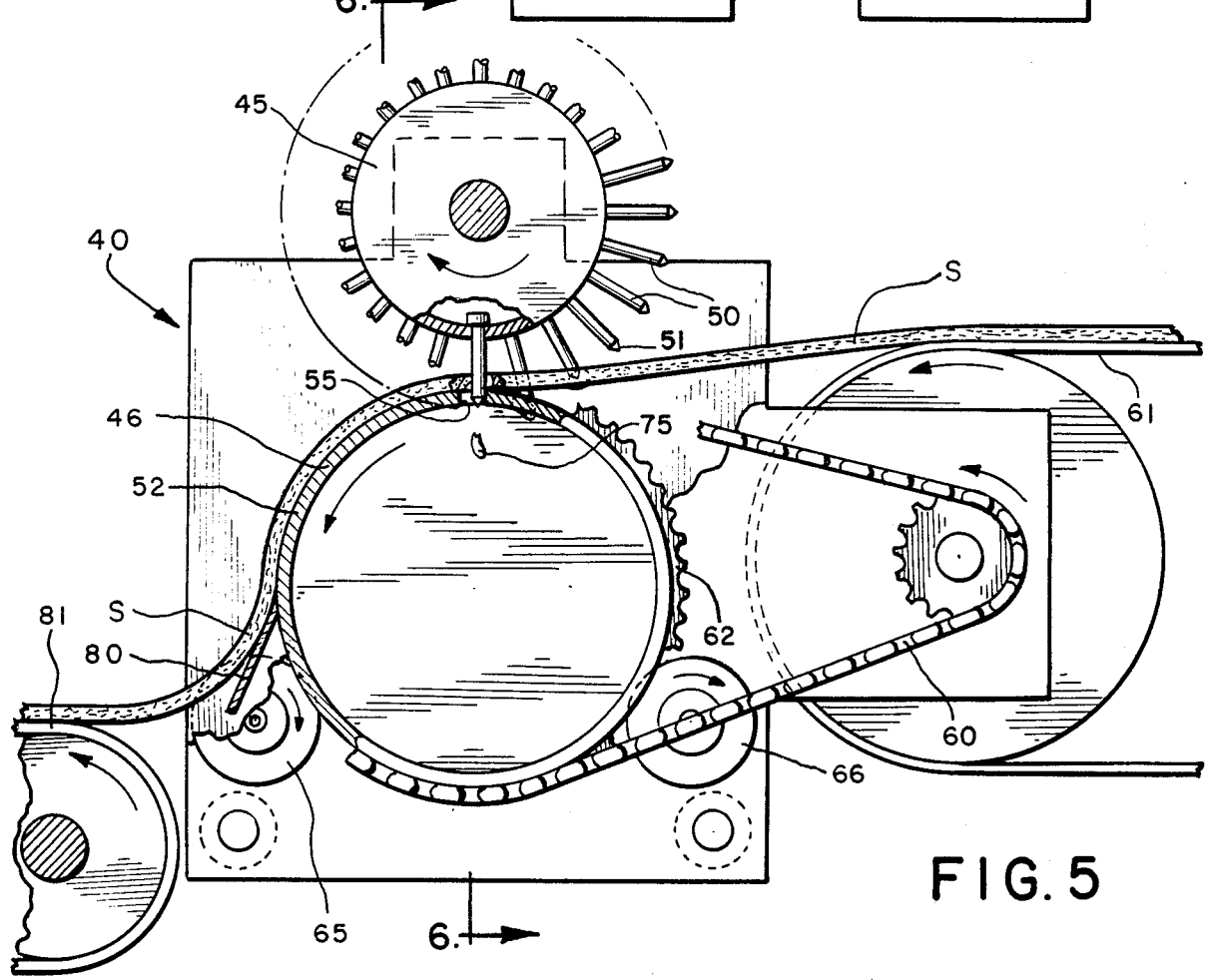
FIG. 5 is a sectional view through a dough sheet perforating unit performing a step in the inventive process.

As best seen in FIGS. 5 and 8, the drum 46 is driven by a sprocket chain 60 from a feed conveyor 61 for the sheet S of pizza dough. The chain 60 engages a sprocket 62 on one end of the drum 46 and rotates it in a counterclockwise direction.

The drum 46 is hollow and does not rotate on a center shaft but, rather, is supported for rotation on its axis on a set of three external rollers 65, 66, 67, provided at each end of the drum 46 (only one set shown). The rollers 65, 66, 67 are suitably mounted on the unit frame 68.

Rotation of the lower drum 46 causes the upper drum 45 to rotate by virtue of the meshing relationship between the pins 50 and the apertures 55. The circumferential elongation of the apertures 55 permits the pin tips 51 to mesh smoothly with corresponding apertures as the pins 50 move in their arcuate paths. The spiral pattern of the pin 50 rows AA, BB, CC, et seq., arranged at a 30° angle to the axis of the drum 45, assures a smooth, uninterrupted rotation of the upper drum 46.

Referring to FIGS. 5 and 8, the sheet S of dough moves toward the drums 45 and 46 on the feed conveyor 61. The drums 45 and 46 rotate at a speed corresponding to the linear speed of the sheet S. As the sheet S passes between the drums 45 and 46 it rides on the lower drum 46.

As the sheet S passes between the drums 45 and 46 the tips 51 of succeeding pins 50 penetrate the sheet while the drum 45 rotates in a clockwise direction. Because each pin 50 is one-quarter inch ($\frac{1}{4}''$) longer than the distance between the drums 45 and 46 its tip 51 initially enters the dough at a substantial angle to a plane normal to the dough sheet S at the point of entry. The pin 50 then passes through a relationship where it is normal to the sheet S. Finally, the pin tip 51 exits the dough when the pin 50 reaches a corresponding but opposite angle to the normal plane.

The perforation each pin 50 forms in the dough sheet is elongated in the direction of the dough sheet travel. An elongation to approximately three-eighths of an inch (⅜") is effected even though the pins 50 are only one-eighth inch (⅛") in diameter.

The elongation is permanent because, it has been discovered, as the pins 50 enter the sheet S at a substantial angle and pass through into the lower drum apertures 55 they are effective to punch small plugs 75 of dough out of the sheet and through the apertures. As seen in FIG. 1, these plugs 75 collect inside the drum 46 and, in the process of its rotation, migrate to one end where they are collected and recycled in the dough making process.

The perforated dough sheet S is lifted off the drum 46 by the action of a scraper blade 80. The sheet S slides across the blade 80 onto a take-out conveyor 81 which carries the sheet to the dough base cuttting unit (see block FIG. 4).

As the perforated dough sheet S moves along on the conveyor 81 it is cut into individual dough bases in a conventional manner. The individual dough bases proceed into a conventional deep fryer where they are submerged in the hot oil under a moving, fine mesh screen and travel through the hot oil with the screen. The natural buoyancy of the frying dough bases holds them against the screen, developing sufficient friction to cause the bases to move with the screen.

The frying process takes between twenty (20) and forty (40) seconds. The fried crusts 11 are then removed from the fryer by a conveyor which carries them up and out of the hot oil and deposits them, on edge, to drain. As the crusts 11 drain they are moved through a cooling tunnel.

After cooling, the crusts 11 are topped according to the invention. This is done on a moving conveyor (not shown). First they pass under a "waterfall" of tomato sauce. A sauce coat 21 is formed on the top surface 13 of the crust 11. Sauce also collects in the funnels 31 on the top surface.

As the partially coated crust 11 moves on, to next receive a layer of cheese topping, some of the tomato sauce flows through the crust's perforations 12 before it congeals. The sauce coat 21 spreads out slightly around each perforation 12 on the bottom surface 15 of the crust. A pool of sauce forms in each funnel 31 and some seeps into the crust itself from these funnels. The crust is thus "impregnated" with flavor.

The crust 11 is then topped with cheese and other topping materials, in a conventional manner, to complete the toppings 20. The topping materials are all applied as the crust 11 moves along the conveyor. When the toppings 20 are all applied the pizza 10 is frozen and packaged.

The pizza 10 produced is superior to both the Neopolitan pizza and the commercial version of it which has been marketed for several years. The crust contains virtually no "white" areas, i.e., areas where less frying has taken place because steam was trapped beneath the crust during frying. Removal of the plugs of dough prevents substantially all of the preforations 12 from frying closed. Steam under the frying dough base can escape up through every unclosed perforation 12.

The height of the fried crust, i.e., the extent to which it expands vertically in the blister forming process, is controlled within acceptable limits by the perforation pattern, spacing and dough formulation. No confining member is utilized to achieve a precisely predetermined maximum crust (blister) height. Any blister which expands vertically to a height which will make packaging difficult is flattened somewhat by sizing rollers used after topping and freezing to assure uniform product height.

As has been pointed out, when the crust 11 is topped pools of sauce topping 30 form areas of enhanced flavor in the pizza 10. The crust becomes "impregnated" with sauce in the funnel 31 areas and, as a result, the entire pizza 10 is more tasty.

While the process and products described herein are presently considered to be preferred should be is understood that various modifications and improvements may be made in them and it is intended to cover in the appended claims all such modifications and improvements as fall within the true spirit and scope of the invention.

What is desired to be secured and claimed by Letters Patent of the United States is:

1. A process of preparing a pizza, comprising the steps of:
    (a) forming a flat, thin dough base for a pizza crust;
    (b) removing a plurality of plugs from the dough base to form a pattern of perforations through the dough base where the plugs have been removed;
    (c) frying the dough base by immersing it in a fluid medium;
    (d) removing the fried crust from said fluid medium; and
    (e) applying sufficient sauce to the upper surface of the crust so that a coating of sauce is formed on said upper surface, at least some sauce flows through said perforations onto the lower surface of the crust and pools of sauce form on the upper surface over said perforations.

2. The process of claim 1 further comprising the step of:
    (a) frying the dough base by submerging it in a hot oil bath.

3. The process of claims 1 further comprising the step of:
    (a) removing a plurality of plugs from the dough base to form perforations through the dough base which are elongated, relative to their widths, in one direction on the dough base.

4. The process of claim 1 further comprising the step of:
    (a) removing said plurality of plugs to form a plurality of rows of perforations with said rows extending parallel to each other.

5. The process of claim 4 further comprising the step of:
    (a) removing said plugs in adjacent rows so that said perforations are staggered in position relative to perforations in adjacent rows.

6. A process of preparing a pizza, comprising the steps of:
    (a) forming a flat, thin dough base for a pizza crust;
    (b) perforating the dough base by removing a plurality of plugs to form a pattern of perforations through the dough base, each perforation being elongated in one direction;
    (c) frying the dough base by immersing it in a hot fluid medium;

(d) removing the fried crust from said fluid medium; and (e) applying sufficient sauce to the upper surface of the crust so that a coating of sauce is formed on said upper surface, at least some of said sauce flowing through said perforations onto the lower surface of the crust and pools of sauce forming on the upper surface over said perforations.

7. The process of claim 6 further comprising the step of:

(a) perforating the dough base with pins extending radially from a drum wherein each of the perforations is about one eighth of an inch, longitudinally of said drum and about three eighths of an inch long, circumferentially of said drum.

8. The process of claim 1 further comprising the step of:

(a) perforating the dough base with pins extending radially from a drum wherein each of the perforations is about one eighth of an inch, longitudinally of said drum and about three eighths of an inch long, circumferentially of said drum.

* * * * *